United States Patent [19]

Furuhata et al.

[11] Patent Number: 4,873,582

[45] Date of Patent: Oct. 10, 1989

[54] VIDEO SIGNAL AND METHOD THEREFOR TIME AXIS ALTERING CIRCUIT USED IN A VIDEO TAPE RECORDER FOR RECORDING A BROADBAND VIDEO SIGNAL

[75] Inventors: Takashi Furuhata, Yokohama; Hitoaki Owashi, Katsuta; Takayasu Ito; Masakazu Hamaguchi, both of Yokohama, all of Japan

[73] Assignee: Hitachi, Ltd., Tokyo, Japan

[21] Appl. No.: 210,167

[22] Filed: Jun. 21, 1988

Related U.S. Application Data

[63] Continuation of Ser. No. 33,265, Apr. 2, 1987, abandoned.

[30] Foreign Application Priority Data

Apr. 2, 1986 [JP] Japan .................................. 61-74217

[51] Int. Cl.$^4$ .......................... H04N 9/79; H04N 5/76
[52] U.S. Cl. ..................................... 358/310; 358/335; 360/9.1
[58] Field of Search ............... 358/310, 327, 328, 330, 358/335, 133, 134, 319; 360/8, 9.1, 18, 22, 23, 24, 37.1; 369/60

[56] References Cited

U.S. PATENT DOCUMENTS

| | | | |
|---|---|---|---|
| 3,919,716 | 11/1975 | Yumde et al. | 360/9.1 |
| 3,950,607 | 4/1976 | Southworth et al. | 358/134 |
| 4,467,368 | 8/1984 | Horstmann | 358/310 |
| 4,472,745 | 9/1984 | Foerster et al. | 358/310 |
| 4,488,182 | 12/1984 | Takahashi et al. | 358/310 |
| 4,549,227 | 10/1985 | Hashimoto et al. | 358/310 X |
| 4,611,250 | 9/1986 | Yoshinaka et al. | 358/335 X |
| 4,630,131 | 12/1986 | Ichinoi et al. | 358/310 |
| 4,630,132 | 12/1986 | Terada et al. | 358/310 |
| 4,641,201 | 2/1987 | Ichinoi et al. | 358/310 |
| 4,686,582 | 8/1987 | Lovely | 358/310 |
| 4,757,392 | 7/1988 | Awamoto et al. | 360/22 X |

Primary Examiner—W. B. Perkey
Attorney, Agent, or Firm—Antonelli, Terry & Wands

[57] ABSTRACT

Disclosed is a magnetic recording-playback apparatus suitable for recording and reproducing a signal including a broad-band composite video signal and a method therefor. The broad-band signal is time-sliced into signals in two channels, and each divided signal is expanded on the time axis so that it is converted into a lower-band signal before being recorded on a magnetic tape. In the time axis expansion process, the vertical blanking signal and/or horizontal blanking signal is not expanded, whereby the divided video signals have a still lower frequency band.

18 Claims, 7 Drawing Sheets

VIDEO SIGNAL AND METHOD THEREFOR TIME AXIS ALTERING CIRCUIT USED IN A VIDEO TAPE RECORDER FOR RECORDING A BROADBAND VIDEO SIGNAL

This application is a continuation of application Ser. No. 033,265, filed Apr. 2, 1987, now abandoned.

BACKGROUND OF THE INVENTION

This invention relates to a magnetic recording-playback apparatus, and particularly to a video signal time axis altering circuit used in a magnetic recording-playback apparatus suitable for recording a broad-band video signal after dividing it into signals in multiple channels on a magnetic recording medium and a method therefor.

The development is under way for the so-called "high quality television system" which reproduces pictures in quality, particularly in fineness, incomparably higher than the conventional NTSC television system. The new system involves more image information and thus necessitates wider frequency band by several times than the conventional system.

A key subject to bring the high quality television system into practice is the achievement of a magnetic recording-playback apparatus, i.e., VTR, capable of recording a broad-band video signal and reproducing high quality pictures properly. A test-model VTR used for the high quality television system is described in the technical report of The Institute of Television Engineers of Japan, entitled "VTR for high quality television", by Oketani, Tateno and Tsujikawa, Vo. 8, No. 33, published in Nov. 1984. The VTR, which is oriented mainly to television broadcasting studios, employs a head drum in large diameter so as to deal with broad-band frequencies and records a video signal in a divided form on four-channel tracks on the magnetic tape.

In order for the high quality television system to prevail as a household appliance, the VTR used for the system must be compact, inexpensive, and capable of long-time recording on a small cassette tape. To meet these requirements, the head drum must be small in size, the magnetic heads and signal channels must be small in number, and the associated circuits must be as simple as possible. However, a greater amount of image information to be recorded on the magnetic tape results in an increased recording density on the tape, which imposes technical difficulties in practicing the VTR oriented to the high quality television system.

SUMMARY OF THE INVENTION

An object of this invention is to provide a video signal time axis altering circuit for magnetic recording-playback apparatus and a method, in which a broad-band video signal is converted into narrow-band signals in multiple channels, the signals are recorded on the respective tracks of a magnetic tape, and the recorded signals are picked up on the tape and converted back to the original broad-band signal.

A primary signal carrying a composite video signal including a vertical blanking signal and horizontal blanking signal is segmented on a time-slice basis in a certain period into signals of N channels, with each signal being expanded on the time axis by N-fold, and consequently each signal has a band width narrowed to 1/N of that of the original signal. Each of the converted signals in multiple channels has a narrow band and therefore can be recorded less densely on a magnetic tape with a magnetic recorder without difficulty.

By the N-fold expansion process on the time axis for the divided signals, the vertical and horizontal blanking signals are also expanded. For the vertical and horizontal blanking signals having a summed period, i.e., redundant time, of $\tau$ in one field period of $T_V$, the expanded blanking signals have a summed period, i.e., redundant time, of $N \times \tau$. The video signal is not included in this period of time $N \times \tau$, and therefore the redundant time is desirably as short as possible. Reduction of the redundant time enables further expansion of the video signal on the time axis included in each divided signal. In consequence, the signals recorded on the magnetic tape can have a band width rendered still narrower than 1/N of the original.

The present invention resides in a control circuit and method which much expands the video signal on the time axis without expanding the period of the vertical and/or horizontal blanking signal. The control circuit and method reduces the redundant time by temporarily halting the signal writing to the memory.

DESCRIPTION OF THE PREFERRED EMBODIMENT

An embodiment of this invention will now be described with reference to FIG. 1. Among a broad-band video signal, a luminance signal (Y) is divided into signals in two channels (N=2) to be recorded on the first and second tracks of a magnetic tape, while two chrominance signals ($C_1$ and $C_2$) are converted into line sequential signals to be recorded on the third track of the tape. Namely, this embodiment is oriented to a magnetic recording-playback apparatus of the type of 3-channel division rotary head.

The video signal to be recorded consists of three primary-color video signals, i.e., red (R), green (G) and blue (B), and they are received on terminals 1a, 1b and 1c, respectively. The primary-color video signals R, G, B are converted into a luminance signal $Y_0$ and two chrominance signals $C_{01}$ and $C_{02}$ through the matrix operation by an encoder 10. The luminance signal $Y_0$ produced by the encoder 10 is confined to a band BW by a low-pass filter 11 so that a luminance signal $Y_0$ is produced. The chrominance signals $C_{01}$ and $C_{02}$ from the encoder 10 are also made to have a confined band by respective low-pass filters 12 and 13. The filters 12 and 13 each comprise a low-band filter as a horizontal band-limiting circuit and further include a vertical band limiting circuit. The vertical band-limiting circuit includes a delay circuit and an adding circuit, and operates to limit the band of the chrominance signals $C_{01}$ and $C_{02}$ by summing chrominance signals for more than one different raster. The vertical band-limiting circuit is effective for eliminating the foldover distortion in the vertical direction created in converted line-sequential chrominance signals. As a result, two chrominance signals $C_1$ and $C_2$ confined to a band BW' are produced at the outputs of the filters 12 and 13, respectively.

A block 100 shown by the dashed line stands for a time axis alternating circuit, which divides the luminance signal Y into 2-channel signals and implements time axis expansion so that the redundant portion included in the signal Y becomes minimum, and transforms the two chrominance signals $C_1$ and $C_2$ into a line-sequential signal of one channel and implements time axis expansion so that the redundant portion included in the signals becomes minimum.

Figure 2A:
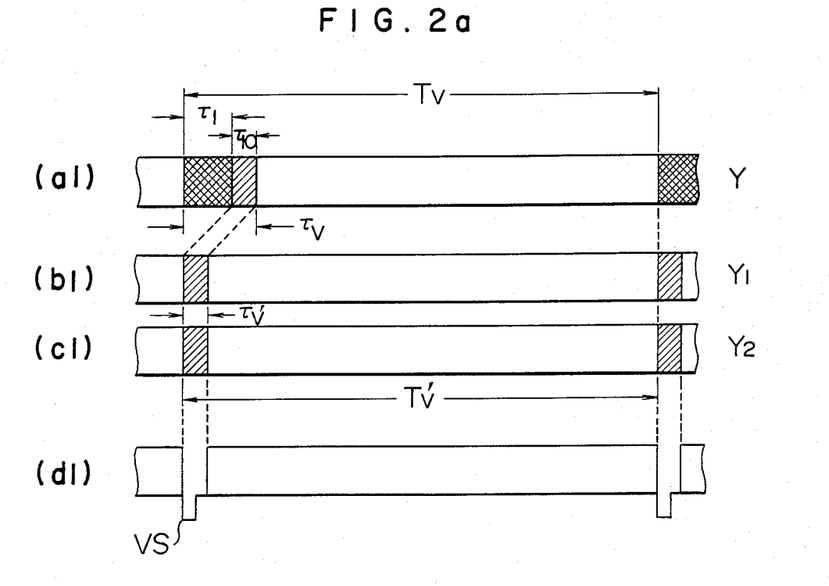
FIG. 2a is a waveform diagram showing the luminance signal in one vertical period produced by the inventive circuit.
Figure 2B:
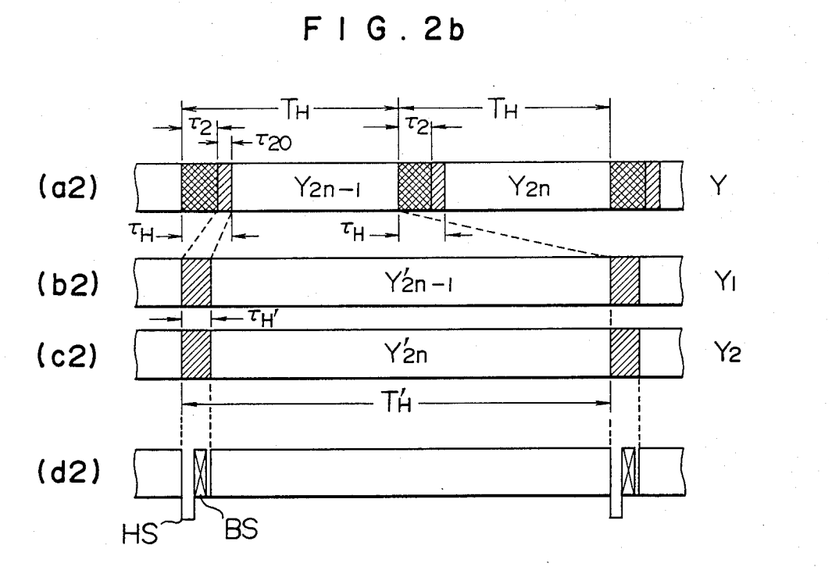
FIG. 2b is a waveform diagram showing the luminance signal in two horizontal periods produced by the inventive circuit.

The operation of the time axis altering circuit 100 will be described in connection with the waveform diagrams of FIGS. 2a and 2b. FIG. 2a shows by (a1) the luminance signal Y derived from the input video signal in one field period $T_V$ provided by the filter 11. The hatched section represents the vertical blanking period $\tau_V$ included in the input video signal. Of the vertical blanking period $\tau_V$, a period $\tau_{10}$ is the minimum necessity of operation and a remaining portion $\tau_1$ (will be termed "vertical redundant period") is not indispensable. FIG. 2b shows by (a2) the waveform of the input video signal in two horizontal scanning periods $T_H \times 2$, which includes in each $T_H$ a horizontal blanking period $\tau_H$ indicated by hatching. Of the horizontal blanking period $\tau_H$, a period $\tau_{20}$ is the minimum necessity of operation and a remaining portion $\tau_2$ (will be termed "horizontal redundant period") is not indispensable.

The present invention is intended to narrow the band occupied by each channel by removing one or both of the vertical redundant period $\tau_1$ and horizontal redundant period $\tau_H$ and by expanding the signal on the time axis for recording. The following describes the operation of the inventive video signal time-axis altering circuit by taking an example of the case where the luminance signal Y is divided into two channels and both of the redundant periods $\tau_1$ and $\tau_2$ are removed.

Figure 1:
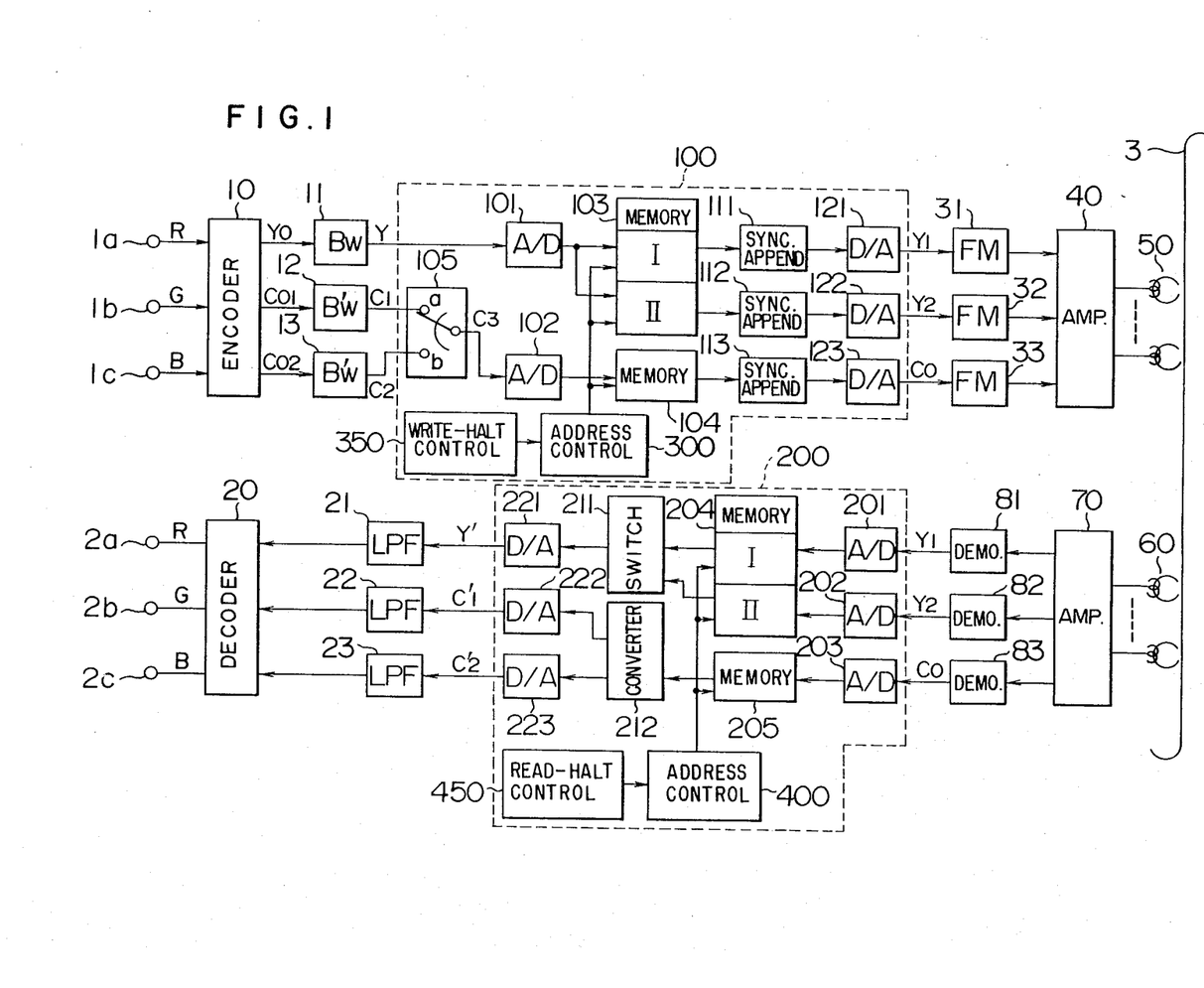
FIG. 1 is a block diagram of the magnetic recording-playback apparatus in which the time axis altering circuit of this invention is used.

In the time-axis altering circuit 100 in FIG. 1, the luminance signal Y (shown by (a1) in FIG. 2a and (a2) in FIG. 2b) supplied from the filter 11 is sampled in response to a sampling clock signal CSY with frequency $f_1$ and converted into a digital signal by means of an A/D converting circuit 101. The sampling clock signal CSY (not shown) may be included in the input video signal, or may be produced from the sync signal in the input video signal. A memory 103 is a RAM chip module for example. The A/D converting circuit 101 has its output signal written alternately in area I and area II of the memory 103 in every horizontal scanning period $T_H$ in response to the write clock signal CWY with frequency $f_1$ produced from the sampling clock signal CSY by an address control circuit 300. During the vertical redundant period $\tau_1$ and horizontal redundant period $\tau_2$, the writing of the signal to the memory 103 is halted by a write-halt control circuit 350 connected to the address control circuit 300. More specifically, among the luminance signal Y shown by (2a) in FIG. 2b, luminance signal $Y_{2n-1}$ of the odd-numbered (2n−1) line is written in the area I of the memory 103, luminance signal $Y_{2n}$ of the subsequent even-numbered (2n) line is written in the area II of the memory 103, and writing to the memory 103 is halted by the write-halt control circuit 350 during the horizontal redundant period $\tau_2$ of each line. Consequently, the memory 103 has its area I storing signal $Y'_{2n-1}$ which is the signal $Y_{2n-1}$ with the horizontal redundant period $\tau_2$ being eliminated as shown by (b2) in FIG. 2b, while its area II storing signal $Y'_{2n}$ which is the signal $Y_{2n}$ with the horizontal redundant period $\tau_2$ being eliminated as shown by (c2) in FIG. 2b. Writing to the memory 103 is halted by the write-halt control circuit 350 also during the vertical redundant period $\tau_1$ in FIG. 2a, and therefore the memory 103 has its areas I and II storing signals $Y_1$ and $Y_2$ each with the vertical redundant period $\tau_1$ being eliminated as shown by (b1) and (c1) in FIG. 2a, respectively. Since the memory areas I and II are written alternately for every line, as mentioned above, the remaining period $\tau_{10}$ of the signal after the vertical redundant period $\tau_1$ has been removed is expanded virtually in an even proportion, as shown by hatching by (b1) and (cl) in FIG. 2a, and written in the areas I and II of the memory 103.

Figure 9:
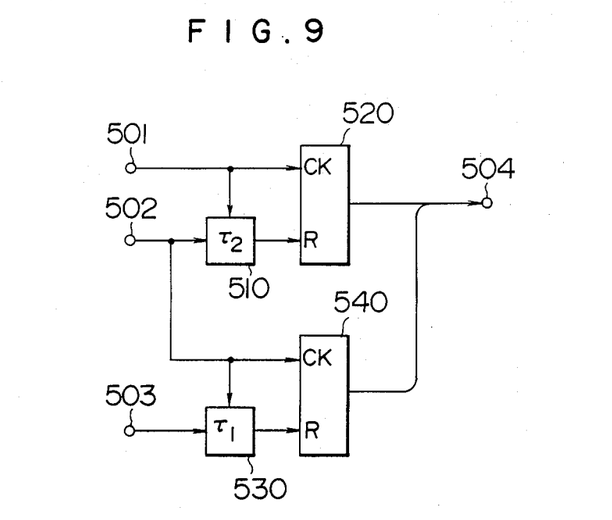
FIG. 9 is a block diagram showing the circuit for removing the vertical and horizontal redundant portions from a video signal.

FIG. 9 shows an example of a means for eliminating the signal portions in the vertical redundant period $\tau_1$ and horizontal period $\tau_2$ when the signal is written in the memory 103. A reset pulse generating circuit 510 detects the horizontal blanking period $\tau_H$ shown by (a2) in FIG. 2b using the horizontal sync signal received on terminal 502, and produces a reset pulse having a pulse width equal to the horizontal redundant period $\tau_2$ by counting the write clock signal CWY received on terminal 501. The preset pulse produced by the reset pulse generating circuit 510 is fed to the reset input terminal R of the address counter 520, and the write clock signal CWY on the terminal 501 is supplied to the clock input terminal CK of the address counter 520. The address counter 520 counts the write clock signal CWY received on its terminal CK and produces an address signal which is dependent on the count value. The address signal is supplied as the pixel write address to the memory 103 by way of the terminal 504 so that pixel data is written in the areas I and II of the memory 103 in response to the advancement of the address signal.

The address counter 520 is cleared by the reset pulse which is sent from the reset pulse generating circuit 510 and received on terminal R, and counting of the write lock signal CWY, i.e., write address advancement, is halted during the period equivalent to the horizontal redundant period $\tau_2$. Consequently, the memory 103 has its areas I and II written signals being rid of a signal portion in the horizontal redundant period $\tau_2$ included in the horizontal blanking period $\tau_H$ on each line shown by (a2) in FIG. 2.

Another reset pulse generating circuit 530 detects the vertical blanking period $T_V$ shown by (a1) in FIG. 2a using the vertical sync signal received on terminal 503, and produces a reset pulse having a pulse width equal to the vertical redundant period $\tau_1$ included in the vertical blanking period $T_V$ by counting the horizontal sync signal received on terminal 502. A line counter 540 counts the horizontal sync signal sent from the terminal 502 to its terminal CK, and produces a line address signal which is dependent on the count value. The line address signal is supplied together with the write address signal from the address counter 520 to the memory 103 by way of the terminal 504. Consequently, lines are written in the areas I and II of the memory 103 in response to the advancement of the line address signal. Of the line address signal, address signal A for the lowest-order count output of the line counter 540 is used to switch the writing to the memory areas I and II at every line. Specifically, during a period when the lowest-order line address signal $A_0$ is "low", an odd-numbered $2n-1$) line in the input video signal is written in the area I of the memory 103, while during a period when the line address signal $A_0$ is "high", an even-numbered (2n) line is written in the area II of the memory 103. The line counter 540 is cleared by the reset pulse which is sent from the reset pulse generating circuit 530 to its terminal R, and counting of the horizontal sync signal, i.e., line address advancement, is halted during the period equivalent to the vertical redundant period $\tau_1$. Consequently, the memory 103 has its areas I and II written signals being rid of a signal portion in the vertical redundant period $\tau_1$ included in the vertical blanking period $T_V$ in each field shown by (a1) in FIG. 2A.

The signals $Y_1$ and $Y_2$ written in the memory 103 are read out sequentially by a read clock signal CRY produced from the sampling clock signal CSY by the address control circuit 300.

The read clock signal has its frequency $f_2$ determined properly to meet the operating condition. In this embodiment, the frequency $f_2$ of the read clock signal CRY is determined such that the 1-field period $T_V'$ (shown in FIG. 2a) of the signals $Y_1$ and $Y_2$ read out of the memory 103 is equal to the 1-field period $T_V$ of the primary signal Y, as follows.

$$T_V' = T_V \quad (1)$$

Since the primary signal Y has its 1-field period $T_V$ being rid of the signal portion in the vertical redundant period $\tau_1$ and the signal Y is divided into signals $Y_1$ and $Y_2$ in two channels, the number L of lines of signals included in the 1-field period $T_V'$ of the signals $Y_1$ and $Y_2$ is given by the following equation.

$$L = (T_V - \tau_1)/(2 \times T_H) \quad (2)$$

Choosing the horizontal scanning period of the signals $Y_1$ and $Y_2$ to be $T_H'$ (will be termed "fundamental period") results.

$$T_V' = L \times T_H' \quad (3)$$

From the above equations (1), (2) and (3), the following equation results.

$$T_H' = 2 \times T_H/(1 - \tau_1/T_V) \quad (4)$$

The primary signal Y is rid of the horizontal redundant period $\tau_2$ from one horizontal scanning period $T_H$ and a signal portion in the remaining period ($T_H - \tau_2$) is expanded to a time length $T_H'$ on the time axis for each line, as mentioned above, and therefore the time axis expansion ratio M is given as follows.

$$M = T_H'/(T_H - \tau_2) \quad (5)$$

The above equations (4) and (5) yield the following equation.

$$M = 2/(1 - \tau_1/T_V) \times (1 - \tau_2/T_H) \quad (6)$$

Namely, by setting the frequency $f_0$ of the read clock signal CRY in relation to the frequency $f_1$ of the sampling clock signal CSY as, $$f_0 = f_1/M \quad (7)$$

the memory 103 provides two signals $Y_1$ and $Y_2$ derived from the primary signal Y with its vertical redundant period $\tau_1$ and horizontal redundant period $\tau_2$ being removed, with it entirety being divided into two channels, and with its time axis being expanded by M-fold, as shown by (b1) and (c1) in FIG. 2a and by (b2) and (c2) in FIG. 2b.

The signals $Y_1$ and $Y_2$ read out of the memory 103 appended with certain synchronizing information by means of synchronizing information inserting circuits 111 and 112, and the resulting output signals are converted to analog signals by D/A converting circuits 121 and 122, respectively. The two luminance signals $Y_1$ and $Y_2$ provided by the D/A converting circuits 121 and 122 are versions of the luminance signal Y with occupied band BW from the filter 11, with its time axis being expanded by M-fold, as will be appreciated from the foregoing, and therefore the signals $Y_1$ and $Y_2$ have their occupied band reduced to BW/M. The two luminance signals $Y_1$ and $y_2$ with occupied band BW/M provided by the D/A converting circuits 121 and 122 in the time axis altering circuit 100 are subjected to pre-emphasizing and frequency modulation (FM) by respective video signal processing circuits 31 and 32, and supplied by way of a recording amplifier 40 to rotary magnetic heads 50. The luminance signal $Y_1$ is recorded as a signal of channel 1 in the first area on the magnetic tape 3, and the luminance signal $Y_2$ is recorded as a signal of channel 2 in the second area on the magnetic tape 3.

Although in the above description the primary signal Y is divided into signals in two channels, when in general the primary signal Y is divided into N channels (where N is an integer larger than 2), the time axis expansion ratio M is given by the following equation.

$$M = N/(1 - \tau_1/T_V) \times (1 - \tau_2/T_H) \quad (8)$$

Accordingly, the larger the values of redundant periods $\tau_1$ and $\tau_2$, the larger time axis expansion ratio M and more reduction of occupied band (BW/M) of each channel signal result. In addition, the larger the number N of channel division, the greater band reduction effect (value of M-N) based on the redundant periods $\tau_1$ and $\tau_2$ results. In contrast, if the primary signal Y is simply divided into N channels without the elimination for the redundant periods $\tau_1$ and $\tau_2$, *i.e., a case of* $\tau_1 = 0$ and $\tau_2 = 0$ in equation (8), the occupied band of each channel is BW/N. Generally, the following relation is met.

$$M > N \quad (9)$$

Accordingly, the occupied band BW/M achieved by the inventive circuit is narrower than the occupied band of the conventional system.

When the signals are frequency-modulated (FM) and recorded magnetically, the S/N ratio of reproduced signals at a constant head-to-tape speed is expressed in terms of the signal occupancy band B, FM modulation index $\alpha$, recording wavelength $\lambda$, and recording track width T as follows.

$$S/N \propto \alpha \sqrt{T\lambda/B} \qquad (10)$$

Since the modulation index $\alpha$ and recording wave length $\lambda$ are virtually in inverse proportion to the signal occupancy band B, the above equation (10) can be approximated as follows.

$$S/N \propto \sqrt{T/B^2} \qquad (11)$$

As a specific example, when the redundancy $(\tau_1/T_V)$ of the vertical redundant period $\tau_1$ is 7% and the redundancy $(\tau_2/T_H)$ of the horizontal redundant period $\tau_2$ is 9%, the above equation (8) at N=2 yields, $$M \approx 2.36 \qquad (12)$$

Accordingly, the inventive circuit achieves the occupied band (BW/M) which is reduced (i.e., band compression) as compared with the occupied band (BW/N) of the conventional system to, $$N/M \approx 1/1.18 \qquad (13)$$

This band compression effect by the inventive circuit is approximately 3 dB improvement in terms of the S/N ratio based on equation (11) as compared with the conventional circuit when the track width T on the magnetic tape is constant. As implied by equation (11), the S/N ratio is proportional to the square root of the track width T, and virtually the same S/N ratio as of the conventional circuit is accomplished by the inventive circuit even if the track width is halved to T/2. Namely, for the achievement of the same S/N ratio, the inventive circuit enables the track width to be halved and thus the tape recording density to be doubled, whereby the recording time length can also be double relative to the case of the conventional circuit.

The synchronizing information inserting circuits 111 and 112 insert certain vertical synchronizing information, e.g., a vertical sync signal VS with negative polarity shown by (d1) in FIG. 2A, in the remaining blanking period $\tau_V'$ after removal of the vertical redundant period $\tau_1$ of the signals Y$_1$ and Y$_2$, as shown by hatching by (b1) and (c1) in FIG. 2A, read out of the memory 103 in its area I and area II, respectively. In case the input primary signal Y includes in its remaining blanking period after removal of the vertical redundant period $\tau_1$, i.e., the period $\tau_V - 1$ shown by hatching by (a1) in FIG. 2a, certain vertical synchronizing information, e.g., a vertical sync signal with negative polarity, the vertical synchronizing information is written in both of the memory areas I and II, and therefore the vertical synchronizing information is available in both of the memory output signals Y$_1$ and Y$_2$. Accordingly, the above-mentioned means of generating and inserting the vertical synchronizing information by the circuits 111 and 112 is rendered unnecessary.

The synchronizing information inserting circuits 111 and 112 further insert certain horizontal synchronizing information, e.g., a horizontal sync signal HS with negative polarity and a cluster of burst signal BS cycling at a certain frequency shown by (d2) in FIG. 2b, in the remaining blanking period $\tau_H'$ after removal of the horizontal redundant period $\tau_2$ of the signals Y$_L$ and Y$_2$, as shown by hatching by (b2) and (c2) in FIG. 2b, read out of the memory 103. In case the input primary signal Y includes in its remaining blanking period after removal of the horizontal redundant period $\tau_2$, i.e., the period $\tau_H - \tau_2$ shown by hatching by (a2) in FIG. 2b, certain horizontal synchronizing information, e.g., a horizontal sync signal with negative polarity and a cluster of burst signal, they are available in both of the memory output signals Y$_1$ and Y$_2$, and accordingly the means of generating and inserting the horizontal synchronizing information by the circuits 111 and 112 is rendered unnecessary.

Figure 3:
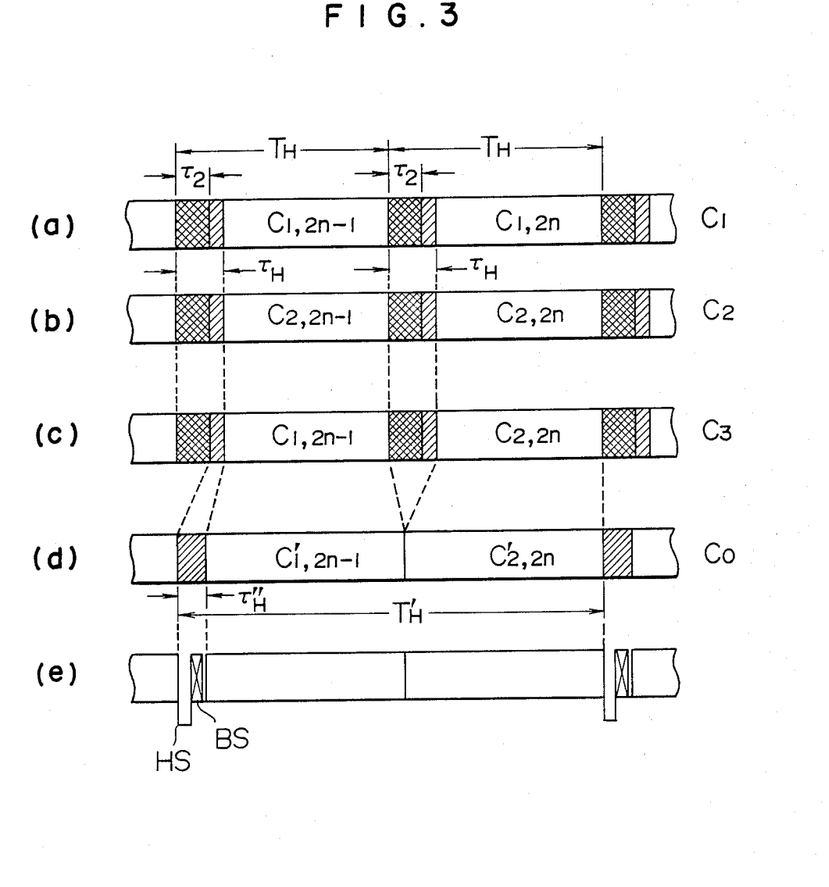
FIG. 3 is a waveform diagram showing the chrominance signal in two horizontal periods produced by the inventive circuit.

Next, the function of the time axis altering circuit for the two chrominance signals C$_1$ and C$_2$ will be described with reference to the waveform diagram of FIG. 3. FIG. 3 shows by (a) and (b) the input primary chrominance signals C$_1$ and C$_2$ in one horizontal scanning period T$_H$ provided by the filters 12 and 13, respectively. The period $\tau_H$ shown by hatching is the same horizontal blanking period as in the aforementioned luminance signal Y, and the period $\tau_2$ is also the same horizontal redundant period. The input primary chrominance signals c$_1$ and C$_2$ actually include the same vertical blanking period $\tau_V$ and vertical redundant period $\tau_1$ as in the luminance signal Y, although these are not shown in FIG. 3. The present invention is also intended to reduce the occupied band of the chrominance signals C$_1$ and C$_2$ by eliminating one or both of the vertical redundant period $\tau_1$ and horizontal redundant period $\tau_2$. The chrominance signals C$_1$ and C$_2$ in two channels are transformed into a line-sequential 1-channel chrominance signal C$_0$ having an occupied band virtually equal to the occupied band (BW/M) of each of the 2-channel luminance signals Y$_1$ and y$_2$.

In FIG. 1, the two chrominance signals C$_1$ and C$_2$ with occupied band BW' provided by the filters 12 and 13, respectively, are fed to terminals a and b of a switching circuit 105 which operates in every horizontal scanning period T$_H$ to select an input. Consequently, the circuit 105 selects a signal of C$_1$ group for an odd numbered (2$_{n-1}$) line to provide a signal C$_{1,2n-1}$, and subsequently selects a signal of C$_2$ group for an even numbered (2n) line to provide a signal C$_{2,2n}$, as shown by (c) in FIG. 3.

The chrominance signal C$_3$ converted in the line sequential form by the switching circuit 105 is sampled by the sampling clock signal CSC with frequency $f_1'$ and converted into a digital signal by means of an A/D converting circuit 102. The sampling clock signal CSC may be included in the input primary video signal, or may be produced from other synchronizing information included in the input signal, as in the case of the sampling clock signal CSY. Alternatively, the sampling clock signal CSC may be generated in synchronism with the sampling clock signal CSY.

The output signal from the A/D converting circuit 102 is written sequentially into the memory 104 in each horizontal scanning period T$_H$ in response to the write clock signal CWC with frequency $f_1'$ produced from the sampling clock signal CSC by the address control circuit 300. Of the line-sequential chrominance signal $C_3$, writing of the memory 104 for a signal $C_{1,2n-1}$ on an odd-numbered $(2n-1)$ line is halted during the horizontal redundant period $\tau_2$ in the horizontal blanking period $\tau_H$ and writing of the memory 104 for a signal $C_{2,2n}$ on the subsequent even-numbered $(2n)$ line is halted during the horizontal blanking period $\tau_H$ by the operation of the write-halt circuit 350 connected to the address control circuit 300.

As a result of the above writing control, the memory 104 stores a signal $C'_{1,2n-1}$ which is the signal $C_{1,2n-1}$ with its horizontal redundant period $\tau_2$ being removed and subsequently a signal $C'_{2,2n}$ which is the signal $C_{2,2n}$ with its horizontal blanking period $\tau_H$ being removed, as shown by (d) in FIG. 3. Needless to say, the vertical redundant period $\tau_1$ is also removed in the stored signal $C_0$. The signal $C_0$ stored in the memory 104 ((d) in FIG. 3) is read out sequentially by the address control circuit 300 in response to the read clock signal CRC with frequency $f_0'$ produced from the sampling clock signal CSC. The frequency of the read clock signal CRC is determined properly depending on the operating condition. In this embodiment, the frequency of the read clock signal CRC is determined such that the fundamental period $T_H'$ (shown by (d) in FIG. 3) of the signal $c_0$ in every two line read out of the memory 104 meets equation (4).

As will be appreciated from the foregoing, the signal with the remaining period $(2T_H - \tau_2 - \tau_H)$ after removal of the horizontal redundant period $\tau_2$ and horizontal blanking period $\tau_H$ from the 2-line period $2T_H$ of the input primary signal $C_3$ is extended on the time axis to the time length $T_H'$, and therefore the time axis expansion ratio $M'$ is given by the following equation.

$$M' = T_H'/(2T_H - \tau_2 - \tau_H) \quad (14)$$

The above equations (4) and (14) yield the following equation.

$$M' = \frac{1}{1 - \frac{\tau_1}{T_V}} \times \frac{1}{1 - \frac{\tau_2 + \tau_H}{2T_H}} \quad (15)$$

Accordingly, in order to attain the time axis expansion $(M' > 1)$, the frequency $f_0'$ of the read clock signal CRC is determined in relation with the frequency $f_1'$ of the sampling clock signal CSC as follows.

$$f_0' = f_1'/M' \quad (16)$$

The signal $C_0$ read out of the memory 104 is appended by a synchronizing information inserting circuit 113 with certain synchronizing information as in the case of the luminance signals $Y_1$ and $Y_2$, e.g., one or both of horizontal synchronizing information including a horizontal sync signal HS with negative polarity and burst signal BS, as shown by (e) in FIG. 3, and vertical synchronizing information including a vertical sync signal with negative polarity, and the resulting signal is converted into an analog signal by a D/A converting circuit 123. The chrominance signal $C_0$ ((e) in FIG. 3) provided by the D/A converting circuit 123 has its time axis expanded by $M'$-fold from that of the primary chrominance signal $C_3$ confined to the band BW' by the filters 12 and 13, and therefore the new occupied band is reduced to BW'/M'. In contrast, the conventional circuit which simply transforms 2-channel simultaneous chrominance signal into a 1-channel, line-sequential chrominance signal without removing the redundant periods $\tau_1$ and $\tau_2$ (equivalent to the case of $M'=1$ in equation (16)) presents an occupied band of BW' for the signal. Since $M'$ is larger than unity, the inventive circuit achieves a narrower occupied band as compared with the conventional circuit.

The chrominance signal $C_0$ with occupied band BW'/M provided by the D/A converting circuit 123 in the time axis altering circuit 100 is subjected to preemphasizing and frequency-modulation (FM) by a video record signal processing circuit 33, and the resulting signal is fed through the recording amplifier 40 to the rotary magnetic heads 50 and recorded as a signal of channel 3 in the third area different from the areas where the luminance signals $Y_1$ and $Y_2$ are recorded on the magnetic tape 3.

By choosing the signal pass bands BW and BW' of the filters 11, 12 and 13 to meet the following relation, $$BW/M \approx MW'/M' \quad (17)$$

the signals $Y_1$, $Y_2$ and $C_0$ to be recorded in the first, second and third areas can have a virtually equal occupied band. Therefore, the signal band is not excessive nor lacking among the channels, and the signals can be recorded and reproduced efficiently.

Figure 4A:
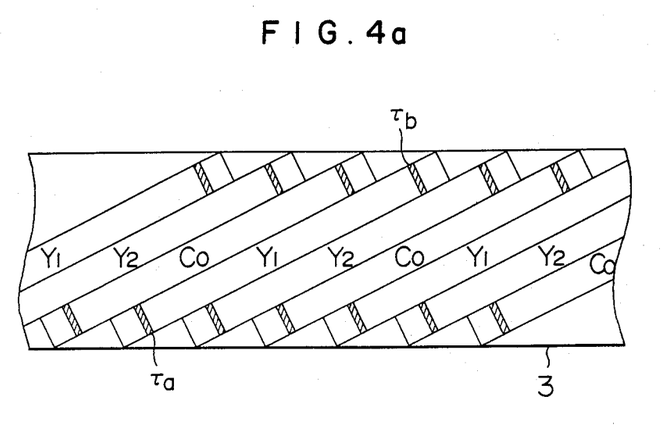
FIGS. 4a and 4b are diagrams showing in pattern the format of the 2-channel luminance signals $Y_1$ and $Y_2$ and the chrominance signal $C_o$ recorded on the magnetic tape with the VTR incorporating the inventive circuit.
Figure 4B:
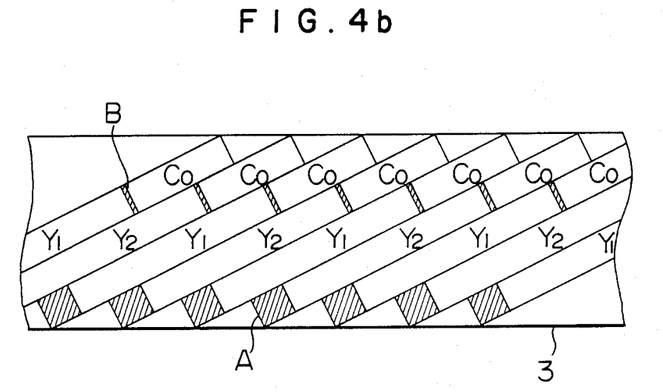

FIGS. 4a and 4b shows examples of the track pattern formed by recording on the magnetic tape 3 using the rotary-head magnetic recording-playback apparatus shown in FIG. 1. In the figures, the first area indicated by $Y_1$ is for recording the luminance signal $Y_1$, the second area indicated by $Y_2$ is for recording the luminance signal $Y_2$, and the area indicated by $C_0$ is for recording the chrominance signal $C_0$. FIG. 4a is the case where the magnetic track is divided in the track traversing direction into three channels ($Y_1$, $Y_2$ and $C_0$) for recording the respective signals, while FIG. 4b is the case where the magnetic track is divided in the track longitudinal direction into two channels ($Y_1$ and $C_0$, or $Y_2$ and $C_0$) and further divided in the track traversing direction into two channels ($Y_1$ and $Y_2$) for recording the respective signals.

Next, the signal reproducing function of the inventive time axis altering circuit will be described. The signals which have been recorded dividedly in multiple channels, i.e., three channels for signals $Y_1$, $Y_2$ and $C_0$, on the magnetic tape 3 are picked up sequentially for each channel using multiple magnetic heads 60 arranged in correspondence to the recording magnetic heads 50. After being amplified by a playback amplifier 70, the luminance signals $Y_1$ and $Y_2$ and the chrominance signal $C_0$ picked up from the first, second and third areas of tracks, respectively, are subjected to demodulation from FM and then de-emphasizing by respective video playback signal processing circuits 81, 82 and 83, and the resulting signals $Y_1$, $Y_2$ and $C_0$ are fed to respective A/D converting circuits 201, 202 and 203 in a time axis reverse-altering circuit 200.

The luminance signal $Y_1$ outputted from the circuit 81 is converted into a digital signal by the A/D converting circuit 201 in response to the sampling clock signal $CSY_1$ with frequency $f_0$ which is given by equation (7), and the resulting signal is written sequentially into area I of a memory 204 by an address control circuit 400 which provides the write clock signal with frequency $f_0$ produced from the sampling clock signal $CSY_1$. The sampling clock signal $CSY_1$ is generated on the basis of the aforementioned synchronizing information superimposed on the luminance signal $Y_1$ in its blanking period at recording, i.e., specifically it is generated in synchronism with the burst signal BS.

Similarly, the luminance signal $Y_2$ outputted from the circuit 82 is converted into a digital signal by an A/D converting circuit 202 in response to the sampling clock signal $CSY_2$ with frequency $f_0$, and the resulting signal is written sequentially by the address control circuit 400 in response to the write clock signal with frequency $f_0$ produced from the sampling clock $CSY_2$. The sampling clock signal $CSY_2$ is generated on the basis of the synchronizing information included in the luminance signal $Y_2$, which is specifically the burst signal BS.

The chrominance signal $C_0$ outputted from the circuit 83 is converted into a digital signal by an A/D converting circuit 203 in response to the sampling clock signal with frequency $f_0'$ which is given by equation (16), and the resulting signal is written sequentially into a memory 205 by the address control circuit 400 in response to the write clock signal with frequency $f_0'$ produced from the sampling clock signal $CSC_0$. The sampling clock signal $CSC_0$ is generated on the basis of the synchronizing information included in the chrominance signal $C_0$, i.e., specifically it is generated in synchronism with the burst signal BS.

As a result of the above writing operation to the memory 204, its area I stores a luminance signal $Y'_{2n-1}$ for an odd-numbered (2n−1) line as shown by (b1) and (b2) in FIGS. 2a and 2b, and the area II stores a luminance signal $Y'_{2n}$ for an even-numbered (2n) line as shown by (c1) and (c2) in FIGS. 2a and 2b.

The luminance signals $Y'_{2n}$ and $Y'_{2n}$ which have been written in the areas I and II of the memory 204 are read out alternately in a period of $T_H$ for each line by the address control circuit 400 in response to the read clock signal CRY' with frequency $M \times f_0$, and reading of the memory 104 for its areas I and II is halted by a read-halt control circuit 450 during a time period $\tau_2$ equal to the horizontal redundant period in each horizontal scanning period $T_H$ and a time period $\tau_1$ equal to the vertical redundant period in each vertical scanning period $T_V$. Subsequently, the luminance signals ($Y'_{2n-1}$ and $Y'_{2n}$) read out of the memory areas I and II alternately are switched by a switching circuit 211 in every horizontal scanning period TH, and the selected output is converted into an analog signal by a D/A converting circuit 221.

As will be appreciated from the foregoing, the reproduced luminance signals $Y_1$ and $Y_2$ are compressed on their time axis by a factor of M-fold depending on the ratio M of the write clock frequency to the read clock frequency for the memory 204. Since the value of M is given by equation (5), the luminance signals ($Y_1$ and $Y_2$) with the horizontal scanning period $T_H$ are compressed on the time axis to $T_H - \tau_2$ for each line and reading of the memory 204 is halted for a duration of $\tau_2$ cyclically in each period $T_H$, and the luminance signal Y' outputted by the D/A converting circuit 221 has the same waveform as shown previously by (a2) in FIG. 2, in which the horizontal redundant period $\tau_2$ which has been removed at recording is restored. Similarly, reading of the memory 204 is halted by the read-halt control circuit 450 for a duration of $\tau_1$ in each vertical scanning period $T_V$, and consequently the luminance signal Y' outputted by the D/A converting circuit 221 has the same waveform as shown by (a1) in FIG. 2A, in which the vertical redundant period $\tau_1$ which has been removed at recording is restored.

Also for the chrominance signal $c_0$ written in the memory 205, the horizontal redundant period $\tau_2$ and vertical redundant period $\tau_1$ which have been removed at recording are restored, the line-sequential chrominance signal is converted into parallel signals, and they are outputted as two chrominance signals $C'_1$ and $C'_2$ from the D/A converting circuits 222 and 223, respectively. Specifically, the chrominance signal $C_0$ which has been written in the memory 205 by the write clock signal with frequency $f'_0$ is read out sequentially in each horizontal scanning period $T_H$ in response to the read clock signal CRC' with frequency $M' \times f'_0$. Reading for the chrominance signal $C'_{1,2n-1}$ for the odd-numbered (2n−1) line equivalent to $C'_{1,2n-1}$ shown by ((d) in FIG. 3) is halted for the duration $\tau_2$ periodically, and thereafter the signal is read out for the period $T_H \tau_2$ by the address control circuit 400. Reading for the chrominance signal $C'_{2,2n}$ for the even-numbered (2n) line (equivalent to $C'_{2,2n}$ shown by (d) in FIG. 3) is halted periodically, and thereafter the signal is read out for the period $T_H - \rho_H$. Similarly, reading of the memory 205 is halted by the read-halt control circuit 450 for a duration of $\tau_1$ in each vertical scanning period $T_V$.

Through the above successive read-halt operation, the line-sequential chrominance signal provided by the memory 205 has the same data structure as shown by (c) in FIG. 3. The reproduced chrominance signal $C_0$ is compressed on the time axis to an extent of M'-fold.

For the chrominance signal $C'_{1,2n-1}$ for the odd-numbered 2n−1) line, the horizontal redundant period $\tau_2$ which has been removed at recording is restored (equivalent to $C_{1,2n-1}$ shown by (c) in FIG. 3). For the chrominance signal $C'_{2,2n}$ for the even-numbered (2n) line, the horizontal blanking period $\tau_H$ which has been removed at recording is restored (equivalent to $C_{2,2n}$ shown by (c) in FIG. 3). Furthermore, the vertical redundant period $\tau_1$ is also restored in the chrominance signal. Accordingly, a line-sequential chrominance signal $C'_0$ having a normal vertical blanking period $\tau_V$ and normal horizontal blanking period $\tau_H$ on every line is retrieved from the memory 205. The line-sequential chrominance signal $C'_0$ is transformed into two chrominance signals by a converting circuit 212.

Figure 5:
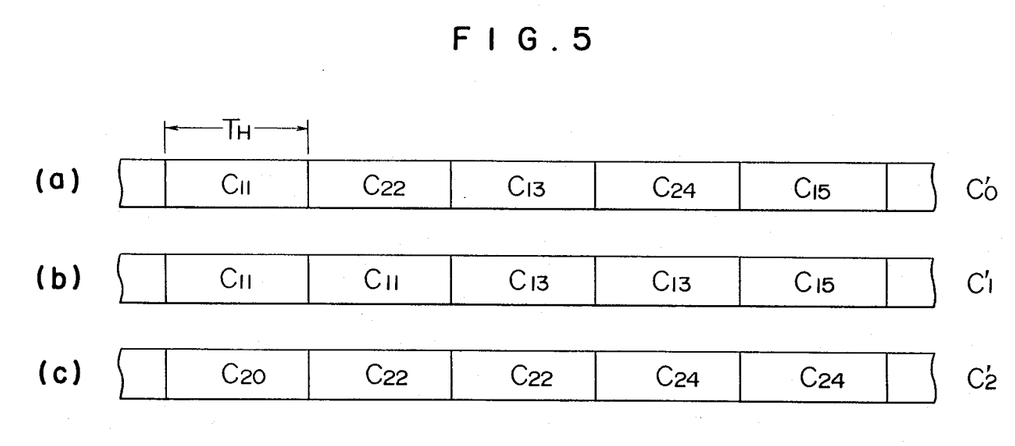
FIG. 5 is a diagram showing line-sequential chrominance signals retrieved from the memory.

The operation of the converting circuit 212 will be described with reference to the waveform diagram of FIG. 5. FIG. 5 shows by (a) the line-sequential chrominance signal $C'_0$ retrieved from the memory 205. It should be noted that the horizontal blanking period $\tau_H$ and vertical blanking period $\tau_V$ are omitted in FIG. 5.

The chrominance signal $C'_0$ from the memory 205 is divided into two signals $C'_1$ and $C'_2$, as shown by (b) and (c) in FIG. 5, by the converting circuit 212. One signal $C'_1$ ((b) of FIG. 5) is obtained by extracting chrominance signals $C_{11}$, $C_{13}$, $C_{15}$, $C_{17}$ and so on of odd-numbered lines in such a duplicate manner for each line as $C_{11}$—$C_{11}$, $C_{13}$—$C_{13}$, $C_{15}$—$C_{15}$ and so on from the line-sequential chrominance signal $C'_0$ ((a) of FIG. 5). Similarly, another signal $C'_2$ ((c) of FIG. 5) is obtained by extracting chrominance signals $C_{22}$, $C_{24}$, $C_{26}$, $C_{28}$ and so on of even-numbered lines in such a duplicate manner for each line as $C_{22}$—$C_{22}$, $C_{24}$—$C_{24}$, $C_{26}$—$C_{26}$ and so on from the line-sequential chrominance signal $C'_0$ ((a) of FIG. 5). The divided chrominance signals $C'_1$ and $C'_2$ derived from the line-sequential chrominance signal $C'_0$ are fed to respective D/A converting circuits 222 and 223, and converted into analog signals.

By the operation of the time axis reverse-altering circuit 200, the chrominance signals $C'_1$ and $C'_2$ are converted into signals having the normal time axis. The luminance signal Y' and chrominance signals C'$_1$ and C'$_2$ from the respective D/A converting circuits 221, 222 and 223 are filtered by respective low-pass filters 21, 22 and 23 so that unwanted signal components are eliminated. Thereafter, the three signals are subjected to matrix demodulation by a decoder circuit 20, and primary color signals of red (R), green (G) and blue (B) corresponding to the original three primary color signals are obtained at the output terminals 2a, 2b and 2c of the decoder circuit 20.

Figure 6:
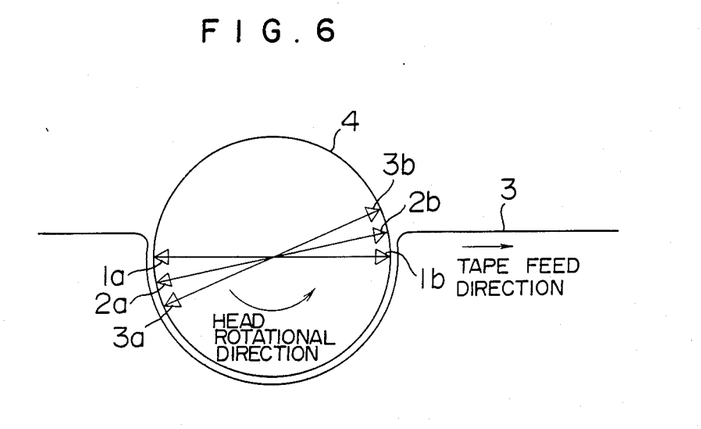
FIG. 6 is a diagram showing the disposition of the magnetic heads in the VTR incorporating the inventive circuit.

FIG. 6 shows an example of the head drum which mounts recording magnetic heads 50 and playback magnetic heads 60 shown in FIG. 1. In the figure, magnetic heads 1a and 1b are mounted on a concentric circle on the head drum 4 with a 180° spacing between the heads. Magnetic head pairs 2a-2b and 3a-3b are each mounted in the same fashion with a 180° spacing from each other on the same concentric circle when seen on the plan view of FIG. 6. The magnetic heads 1a, 2a and 3a are located closely with a vertical offset being made between them, while the magnetic heads 2a, 2b and 2c are located closely with a vertical offset being made between them. A magnetic tape 3 is wound on the head drum 4 to cover an angular range slightly in excess of 180° so as to confront at least half of the magnetic heads 1a, 2a, 3a, 1b, 2b and 3b at any time.

The head drum 4 arranged as described above rotates to create a recording track pattern on the magnetic tape 3 as shown in FIG. 4a. The magnetic heads 1a and 1b work alternately to record the signal of channel 1 (i.e., luminance signal Y$_1$) on a track Y$_1$, the magnetic heads 2a and 2b work alternately to record the signal of channel 2 (i.e., luminance signal Y$_2$) on a track Y$_2$, and the magnetic heads 3a and 3b work alternately to record the signal of channel 3 (i.e., chrominance signal C$_0$) on a track C$_0$.

Figure 7:
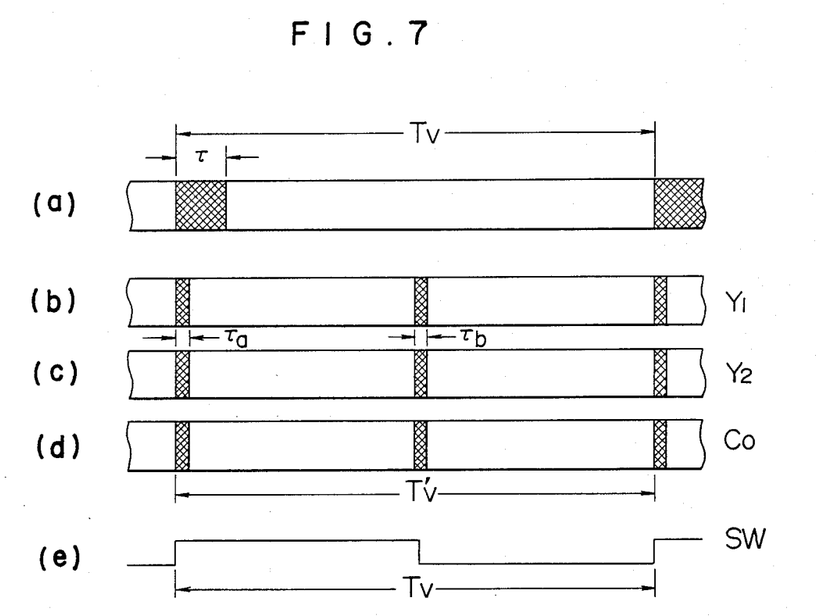
FIG. 7 is a waveform diagram showing a signal in one vertical period recorded suitably with the magnetic heads shown in FIG. 6.

FIG. 7 shows the timing relationship of the time axis altering process implemented by the time axis altering circuit 100 in recording mode in which the head drum 4 shown in FIG. 6 is brought to a high-speed rotation. In the operation shown in FIG. 7, the rotational period of the head drum 4 is set equal to the field period T$_V$ of the primary video signal to be recorded (shown by (a) in FIG. 7). Shown by (e) is a head switching signal SW produced in synchronism with the rotation of the head drum 4, and accordingly it has a period equal to T$_V$. During the period with a "high" head switching signal SW, the magnetic heads 1a, 2a and 3a are in contact with the magnetic tape 3, while during the period with a "low" SW, the magnetic heads 1b, 2b and 3b are in contact with the tape 3 for signal recording or reproduction. The group of magnetic heads 1a, 2a and 3a and the group of magnetic heads 1b, 2b and 3b are switched at the rising and falling edges of the head switching signal SW.

The inventive circuit arrangement is capable of completely eliminating for all channels the time axis errors, such as "skew" at a signal linkage portion, occurring at the switching of heads due to extension or contraction of the magnetic tape. The following describes the basis of this ability according to the present invention.

As described above, the inventive circuit operates to record a video signal on the magnetic tape after removing the redundant periods ($\tau_1$, $\tau_2$) included in one or both of the vertical blanking period ($\tau_V$) and horizontal blanking period ($\tau_H$) so that only minimum necessary blanking periods ($\tau_V - \tau_1$, $\tau_H - \tau_2$) are left. Moreover, the inventive circuit allows part or all of the redundant periods to be used for the time axis altering process or other purposes such as recording a signal other than the video signal.

FIG. 7 shows the signals of the case where part of the redundant periods is used for another purpose. Specifically, in order to modify the signal time axis following the head switching in recording mode, part of the redundant periods is allotted to the head switching section. Shown by (a) in FIG. 7 is the waveform of one field period T$_V$ of the primary video signal to be recorded, and the redundant period $\tau$ included in the field is indicated by cross-hatching.

Generally, the redundant period $\tau$ is given in terms of the vertical redundant period $\tau_1$ and horizontal redundant period $\tau_2$ by the following expression.

$$\tau = \tau_1 + l \times \left(1 - \frac{\tau_1}{T_V}\right) \times \tau_2 \qquad (18)$$

where l is the number of lines in a field of the primary video signal. Using the period $\tau$, the former equation (8) is reduced to as follows.

$$M = N/(1 - \tau/T_V) \qquad (19)$$

FIG. 7 shows by (b), (c) and (d) the luminance signals Y$_1$ and Y$_2$ and chrominance signal C$_0$ provided at the outputs of the D/A converting circuits 121, 122 and 123 following the time axis process by the time axis altering circuit 100. In the circuit 100, the head switching signal SW is supplied to a circuit (not shown) for controlling the reading of the memories 103 and 104, so that reading of the memories 103 and 104 commences at a timing in synchronism with the rising and falling edges of the SW signal. The reading operation for the memories 103 and 104 takes place following the above commencement for a certain duration on the basis of line count for example. Through the above memory read control, the video signal is recorded by being accompanied by part (periods $\tau_a$ and $\tau_b$) of the redundant period $\tau$ at the front and end of the head switching portion (i.e., inphase with the rising and falling edges of the head switching signal SW), as shown by cross-hatching by (b), (c) and (d) in FIG. 7.

With the intention of eliminating the residual redundant periods but the partial ones $\tau_a$ and $\tau_b$, the time axis expansion ratio M is set in the circuit 100 (the section for the luminance signal) to meet the following equation.

$$M = N \times \left(1 - \frac{\tau_a + \tau_b}{T_V}\right) / \left(1 - \frac{\tau}{T_V}\right) \qquad (20)$$

where N is set to 2 in this embodiment as mentioned previously. In consequence, the residual redundant periods but $\tau_a$ and $\tau_b$ are removed, and the redundant periods $\tau_a$ and $\tau_b$ are formed at positions shown by hatching in FIG. 4a.

In reproducing the luminance signals Y$_1$ and Y$_2$ and chrominance signal C$_0$ which have been recorded through the foregoing process, the magnetic heads are switched invariably within the redundant periods $\tau_a$ and $\tau_b$ formed as described above, and therefore dropout of reproduced signal does not occur, nor occurs a signal dropout due to extension or contraction of the magnetic tape, provided that the value of $\tau_a$ and $\tau_b$ is set greater than the possible time axis error (skew) caused by extension or contraction of the magnetic tape. In addition, as will be appreciated from the description in connection with FIG. 1, the time axis reverse-altering circuit 200 also serves to eliminate time axis errors included in the reproduced signals $Y_1$, $Y_2$ and $C_0$ owing to the time buffering effect of the memories 204 and 205, and therefore the above-mentioned skew can also be eliminated completely. Moreover, since the redundant periods $\tau_a$ and $\tau_b$ are formed without fluctuation at invariable positions on the magnetic tape 3 in synchronism with the head drum rotation, the head switching can take place invariably within the period $\tau_a$ or $\tau_b$, which significantly improves the interchangeability of the recording-playback apparatus. This property facilitates the recording of a video signal in multiple segments for each field, and from another viewpoint this facilitates recording using a smaller head drum rotating at a higher speed and consequently fosters reduction in the size and weight of the magnetic tape recording-playback apparatus.

Figure 8:
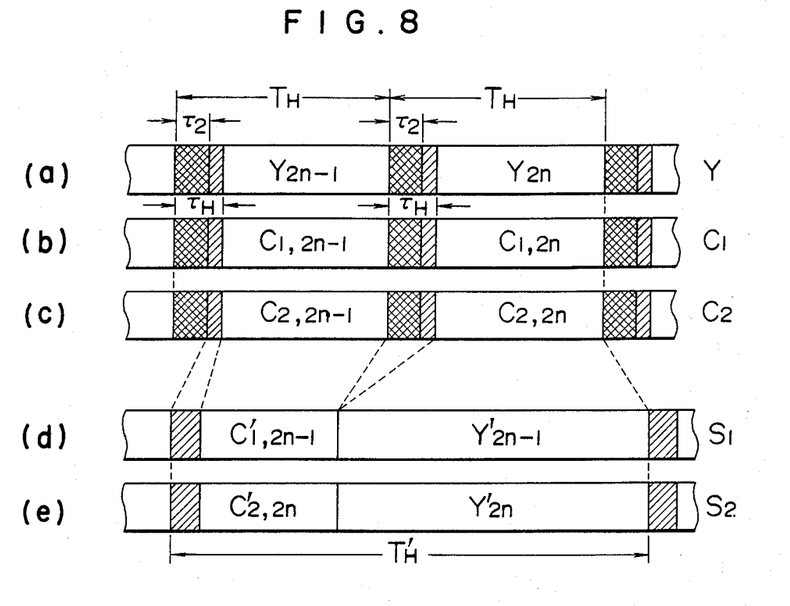
FIG. 8 is a waveform diagram showing time-slot multiplexing for the luminance and chrominance signals.

FIG. 8 shows by (a), (b) and (c) a luminance signal Y (equivalent to the Y in FIG. 2) and two chrominance signals $C_1$ and $C_2$ (equivalent to the $C_1$ and $C_2$ in FIG. 3) in a primary video signal. Shown by (d) and (e) are 2-channel signals $S_1$ and $S_2$ resulting from the time axis process and time-slot multiplexing within the fundamental period $T_H'$ for the signals shown by (a), (b) and (c). The signal $S_1$ of one channel includes a signal $Y_{2n-1}$ on an odd-numbered line in the luminance signal Y and a signal $C_{1,2n-1}$ on the odd-numbered line in the chrominance signal $C_1$ in a time-slot multiplexed formation for each line, while the signal $S_2$ of another channel includes a signal $Y_{2n}$ on an even-numbered line in the luminance signal Y and a signal $C_{2,2n}$ on the even numbered line in the chrominance signal $C_2$ in a timeslot multiplexed formation for each line. The two signals $S_1$ and $S_2$ have their fundamental period $T_H'$ given by the previous equation (4), and for a general case of N-channel division it is given by the following equation.

$$T_{H'} = N \times T_{H/}\left(1 - \frac{\tau_1}{T_V}\right) \quad (21)$$

On this account, the fundamental period $T_H'$ takes a value larger than N times the horizontal scanning period $T_H$ of the primary video signal, i.e., $T_{H'} > N \times T_H$), and therefore the longer signal fundamental period can more reduce the signal occupancy band as compared with the conventional case where the signal is simply divided into N channels (equivalently the case of $\tau_1 = 0$ in equation (21)).

Although illustrated in FIG. 8 is the time-slot multiplexing for a line of luminance signal and a line of chrominance signal within the fundamental period $T_H'$, an arbitrary number of lines of signals may be multiplexed within the $T_H'$. Increasing the number of lines of signals included in the fundamental period $T_H'$ can reduce the total horizontal blanking period ($\tau_H$) of these lines. In the example shown by (d) in FIG. 3, the entire horizontal blanking period $\tau_H$ for the signal $C'_{2,2n}$ can be eliminated, or in the example shown by (d) and (e) in FIG. 8, the entire horizontal blanking periods $\tau_H$ for the signals $Y'_{2n-1}$ and $Y'_{2n}$ can be eliminated, resulting in a further reduction of the signal occupancy band.

As described above, the inventive circuit operates to record a broad-band video signal on the magnetic tape by minimizing the redundancy of the signal and dividing the signal into multiple channels with a minimal occupied band. The consequent reduced signal recording density on each channel enables the use of a smaller head drum, whereby the high-quality television signal having a broad frequency band can be recorded and reproduced relatively easily.

We claim:
1. A video signal time axis altering circuit for transforming a broad-band video signal including a blanking signal with a period $\tau$ into narrow-band video signals in a plurality of channels by dividing said broad-band video signal into signals in a plurality (N; $N \geq 2$) of channels on the time axis and expanding the divided signals on the time axis, said circuit comprising:
   (a) an analog-to-digital converting circuit which receives said broad-band video signal and quantizes said signal into a digital signal;
   (b) a memory connected to said analog-to-digital converting circuit and having a plurality of storage areas, said memory receiving a quantized video signal from said analog-to-digital converting circuit and storing said quantized video signal in said storage areas by dividing said quantized video signal into a plurality of signals in a predetermined period;
   (c) a plurality of digital-to-analog converting circuits each of which receives a quantized video signal retrieved from each of said storage areas of said memory and converts said signal into an analog signal;
   (d) an address control signal generating circuit which is connected to said memory, produces a writing clock signal for controlling the writing of said quantized video signal to said memory and a reading clock signal for controlling the reading of stored video signal out of said memory, and supplies said writing clock signal and reading clock signal to said memory, said writing clock signal having a frequency $f_1$ determined in such a relation with a frequency $f_2$ of said reading clock signal of $f_1 > N \times f_2$; and
   (e) a write-halting control circuit which is connected to said address control signal generating circuit and produces a signal which causes said writing clock signal to halt temporarily the writing of said quantized video signal to said memory in said blanking signal period $\tau$.

2. A video signal time axis altering circuit according to claim 1, wherein said write halting control circuit halts temporarily the writing of said equantized video signal to said memory, in a period $\tau_1$ of a vertical blanking signal.

3. A video signal time axis altering circuit according to claim 1, wherein said write-halting control circuit halts temporarily the writing of said quantized video signal to said memory in a period $\tau_2$ of a horizontal blanking signal.

4. A video signal time axis altering circuit according to claim 1, wherein said write-halting control circuit halts temporarily the writing of said quantized video signal to said memory in a period $\tau_1$ of a vertical blanking signal and a period $\tau_2$ of a horizontal blanking signal.

5. A video signal time axis altering circuit comprising:

(a) a memory having a plurality (N; N≧2) of storage areas where digital video signals in a plurality (N) of channels are written in and read out;

(b) an address control signal generating circuit which is connected to said memory and produces a writing clock signal for controlling the writing of said digital video signals to said memory and a reading clock signal for controlling the reading of stored video signals from said memory, and supplies said writing clock signal and reading clock signal to said memory; and (c) a read-halting control circuit which is connected to said address control signal generating circuit and produces a signal which causes said reading clock signal to halt temporarily the reading of stored digital video signals from said memory in a period of a blanking signal included in said digital video signals.

6. A video signal time axis altering circuit for transforming a broad-band video signal of a horizontal scanning period $T_H$ including a blanking signal with a period $\tau_H$ into narrow-band video signals in a plurality of channels by dividing said broad-band video signal into signals in a plurality (N; N≧2) of channels on the time axis and expending the divided signals on the time axis, said circuit comprising:

(a) analog-to-digital converting means for receiving said broad-band video signal and quantizing said received signal into a digital signal;

(b) memory means connected to said analog-to-digital converting means and having a plurality of storage areas, said memory means receiving a quantized video signal from said analog-to-digital converting means and storing said quantized video signal in said storage areas by dividing said quantized video signal into a plurality of signals;

(c) digital-to-analog converting means for receiving said quantized video signal retrieved from each of said storage areas of said memory and converting said received quantized signal into an analog signal; and (d) address control signal generating circuit means connected to said memory means for producing a writing clock signal of frequency $F_1$ for controlling the writing of said quantized signal to said memory means and a reading clock signal of frequency $F_0$ ($F_0 = F_1/M$; M>N) for controlling the reading of said quantized signal out of said memory means to said memory means except for the period $\tau$ ($\tau < \tau_H$) in the period $\tau_H$ and for supplying said reading clock signal to said memory means;

whereby said narrow-band video signal of a horizontal scanning period $T_H'$, is provided at an output terminal of said memory means.

7. A video signal time axis altering circuit for transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels by dividing said broad-band video signal into signals in a plurality (N; N≧2) of channels on the time axis and expanding the divided signals on the time axis, said circuit comprising:

(a) analog-to-digital converting means for receiving a broad-band luminance signal and chrominance signal and for quantizing said received signals into a digital signals;

(b) memory means connected to said analog-to-digital converting means and having a plurality of storage areas, said memory means receiving a quantized luminance signal and chrominance signals from said analog-to-digital converting means and storing said quantized luminance signal in said storage areas by dividing said quantized luminance signal into a plurality of signals, said memory means further including a chrominance signal memory area in which said quantized chrominance signal is stored;

(c) digital-to-analog converting means for receiving said quantized luminance signal and chrominance signals retrieved from each of said storage areas of said memory means and converting said received quantized signal into an analog signal; and (d) address control signal generating circuit means connected to said memory means for producing a first writing clock signal of frequency $f_1$ for controlling the writing of said quantized luminance signal into said memory means and a first reading clock signal of frequency $f_0$ ($f_0 = f_1/M$; M>N) for controlling the reading of said quantized luminance signals out of said memory means and for supplying said first writing clock signal and first reading clock signal to said memory means, said address control signal generating circuit further generating a second writing clock signal of frequency $f_1'$ for controlling the writing of said quantized chrominance signal into said memory means and a second reading clock signal of frequency $f_0'$ ($f_0' = f_1'/M'$; M>1) controlling the reading of said quantized chrominance signal out of said memory means, and supplying said second writing clock signal and second reading clock signal to said memory means, whereby a narrow-bank luminance signal of a time axis expansion ratio M and a narrow-band chrominance signal of a time axis expansion ratio M' are provided at output terminals of said memory means.

8. A magnetic recording apparatus with a time axis altering circuit for transforming a broad-band video signal of a vertical scanning period $T_V$ including a vertical blanking signal with a period $\tau_V$ and a horizontal scanning period $T_H$ including a blanking signal a period $\tau_H$ into narrow-band video signals in a plurality of channels by dividing said broad-band video signal into signals in a plurality (N; N≧2) of channels on the time axis and expending the divided signals on the time axis, said circuit comprising:

(a) analog-to-digital converting means for receiving a broad-band luminance signal and chrominance signals and quantizing said received signals into a digital signal;

(b) memory means connected to said analog-to-digital converting means and having a plurality of storage areas, said memory means receiving a quantized luminance signal and quantized chrominance signals from said analog-to-digital converting means and storing said quantized luminance signal in said storage areas by dividing said quantized luminance signal into a plurality of signals, said memory means further including a chrominance signal memory area in which said quantized chrominance signal is stored, (c) digital-to-analog converting means for receiving said quantized luminance signal and chrominance signals retrieved from each of said storage areas of said memory and converting said received quantized signal into an analog signal; and (d) address control signal generating circuit means connected to said memory means for producing a first writing of said quantized luminance signal to said memory means and a first reading clock signal of frequency $f_0(f_0=f_1/M; M=N)$ for controlling the reading of said quantized luminance signals out of said memory means and for supplying said first writing clock signal and first reading clock signal to said memory means, said addresses control signal generating circuit further generating a second writing clock signal of frequency $f_1'$ for controlling the writing of said quantized chrominance signal into said memory means and a second reading clock signal of frequency $f_0'(f_0='f_1/M; M>1)$ for controlling the reading of said quantized chrominance signal out of said memory means, and supplying said second writing clock signal and second reading clock signal to said memory means, (e) said memory means generating a narrow-band luminance signal of a time axis-expansion ratio M and a narrow-band chrominance signal of a time axis expansion ratio M; and (f) recording means having a plurality of magnetic recording heads for recording the narrow-band luminance signal and the narrow-band chrominance signal on a magnetic recording medium.

9. A video signal time axis altering circuit for transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels by dividing said broad-band video signal into signals in a plurality ($N; N\geq 2$) of channels on the time axis and expanding the divided signals on the time axis, said circuit comprising:

(a) analog-to-digital converting means for receiving said broad-band video signal and quantizing said received signal into a digital signal;

(b) memory means connected to said analog-to-digital converting means and having a plurality of storage areas, said memory means receiving a quantized video signal from said analog-to-digital converting means and storing said quantized video signal in said storage areas by dividing said quantized video signal into a plurality of signals;

(c) digital-to-analog converting means for receiving said quantized video signal retrieved from each of said storage areas of said memory and converting said received quantized signal into an analog signal; and (d) address control signal generating circuit means connected to said memory means for producing a writing clock signal for controlling the writing of said quantized signal to said memory means and a reading clock signal for controlling the reading of said quantized signal out of said memory means, for supplying said writing clock signal and reading clock signal to said memory means except for a period $\tau_1$ ($\tau_1<\tau_V$) in the period $\tau_V$ and a period $\tau_2(\tau_2<\tau_H)$ in the period $\tau_H$, and for supplying said reading clock signal to said memory means to said memory means so as to provide said narrow band video signal for a time axis expansion ratio M where $$M \approx N/(1-\tau_1/T_V)\times(1-\tau_2/T_H)$$

at an output terminal of said memory means.

10. A video signal time axis altering circuit for transforming a broad-band video signal of a vertical scanning period $T_V$ including a vertical blanking signal with a period $\tau_V$ and horizontal scanning period $T_H$ including a blanking signal into narrow-band video signals in a plurality of channels by dividing said broad-band video signal into signals in a plurality ($N; N\geq 2$) of channels on the time axis and expanding the divided signals of the time axis, said circuit comprising:

(a) analog-to-digital converting means for receiving a broad-band luminance signal and chrominance signal and for quantizing said received signals into a digital signals;

(b) memory means connected to said analog-to digital converting means and having a plurality of storage areas, said memory means receiving a quantized luminance signal and chrominance signals from said analog-to-digital converting means and storing said quantized luminance signal in said storage areas by dividing said quantized luminance signal into a plurality of signals, said memory means further including a chrominance signal memory area in which said quantized chrominance signals are stored;

(c) digital-to-analog converting means for receiving said quantized luminance signal and chrominance signals retrieved from each of said storage areas of said memory means and converting said received quantized signal into an analog signal; and (d) address control signal generating circuit means connected to said memory means for producing a writing clock signal for controlling the writing of said quantized signal is to said memory means and a reading clock signal for controlling the reading of said quantized signals out of said memory means and, for supplying said writing clock signal and reading clock signal to said memory means except for a period $\tau_1$ ($\tau_1<\tau_V$) in the period $\tau_V$ and for supplying said reading clock signal to said memory means so as to provide said narrow-band video signal of a horizontal scanning period $T_H'$ where $$T_H' \approx N \times T_H \times \frac{1}{\left(1-\frac{\tau_1}{T_V}\right)}$$

at an output terminal of said memory means.

11. A method of recording a video signal on a magnetic recording medium in a magnetic recording apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said method comprising the steps of:

(a) dividing said broad-band video signal into signals of N ($N\geq 2$) channels on the time axis;

(b) removing from the period $\tau_V$ of each vertical blanking signal of each of the divided video signals a signal of a period $\tau_1$ ($\tau_1<\tau_V$), and expanding the time axis of the video signal from which the signal of the period $\tau_1$ is removed thereby to form narrow-band video signals of N channels of a horizontal scanning period TH, where, $T_{H'} \approx N \times T_H/(1-\tau_1/T_V)$; and
(c) recording said narrow-band video signals of N channels on a plurality of magnetic tracks formed on said recording medium by a plurality of magnetic heads.

12. A method of recording a video signal on a magnetic recording medium in a magnetic recording apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said method comprising the steps of:
  (a) dividing said broad-band video signal into signals of N ($N \geq 2$) channels on the time axis;
  (b) removing from the period $\tau_V$ of each vertical blanking signal of each of the divided video signals a signal of a period $\tau_1$ ($\tau_1 < \tau_V$), and removing from the period $\tau_H$ of each horizontal blanking signal a signal of a period 2 ($2 \tau_H$), and expanding the time axis of the video signal lacking the signals of the periods $\tau_1$ and $\tau_2$ thereby to form narrow-band video signals of N channels of a time axis expansion ratio M where, $M \approx N/(1-\tau_1/T_V) \times (1-\tau_2/T_H)$; and
  (c) recording said narrow-band video signals of N channels on a plurality of magnetic tracks formed on said recording medium by a plurality of magnetic heads.

13. A magnetic recording apparatus for recording a video signal on a magnetic recording medium in a magnetic recording apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said apparatus comprising:
  (a) means for dividing said broad-band video signal into signals of N ($N \geq 2$) channels on the time axis;
  (b) means for removing from the period $\tau_V$ of each vertical blanking signal of each of the divided video signals a signal of a period $\tau_1$ ($\tau_1 < \tau_V$);
  (c) means for expanding the time axis of the video signal from which the signal of the period $\tau_1$ has been removed, and for forming narrow-band video signals of N channels of a horizontal scanning period $T_{H'}$, where $T_{H'} \approx N \times T_H/(1-\tau_1/T_V)$; and (d) means for recording said narrow-band video signals of N channels on a plurality of magnetic tracks formed on said recording medium by a plurality of magnetic heads.

14. A magnetic recording apparatus for recording a video signal on a magnetic recording medium in a magnetic recording apparatus by transforming : broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said apparatus comprising the steps of:
  (a) means for dividing said broad-band video signal into a signals of N ($N \geq 2$) channels on the time axis;
  (b) means for removing from the period $\tau_V$ of each vertical blanking signal of each of the divided video signals a signal of a period $\tau_1$ ($\tau_1 < \tau_V$);
  (c) means for removing from the period $\tau_H$ of each horizontal blanking signal of each of the divided video signals a signal of a period $\tau_2$ ($\tau_2 < \tau_H$);
  (d) means for expanding the time axis of the video signal from which the signals of the periods $\tau_1$ and $\tau_2$ have been removed, and for forming narrow-band video signals of N channels of a time axis expansion ratio M where $M \approx N/(1-\tau_1/T_V) (1-\tau_2/T_H)$; and
  (e) means for recording said narrow-band video signals of N channels on a plurality of magnetic tracks formed on said recording medium by using a plurality of magnetic heads.

15. A method of recording and reproducing a video signal on and from a magnetic recording medium in a magnetic recording and playback apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said method comprising the steps of:
  (a) dividing said broad-band video signal into signals of N ($N \geq 2$) channels on the time axis;
  (b) removing from the period $\tau_V$ of each vertical blanking signal of a period $\tau_1$ $\tau_1 < \tau_V$), and expanding the time axis of the video signal from which the signal of the period $\tau_1$ has been removed thereby to form narrow-band video signals of N channels of a horizontal scanning period $T_{H'}$, where, $T_{H'} \approx N \times T_H/(1-\tau_1/T_V)$; and
  (c) recording said narrow-band video signals of N channels on a plurality of magnetic tracks formed on said recording medium by a plurality of magnetic heads,
  (d) reproducing said narrow-band video signals of N channels recorded on said recording medium by a plurality of playback heads;
  (e) expanding the time axis of the reproduced video signals of N channels, and adding the signal of the period $\tau_1$ to the vertical blanking signal; and
  (f) connecting the expanded video signals of N channels serially to form said broad-band video signal of a vertical scanning period $T_V$ and a horizontal scanning period TH.

16. A method of recording and reproducing a video signal on and from a magnetic recording medium in a magnetic recording and playback apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said method comprising the steps of:
  (a) dividing said broad-band video signal into signals of N ($N \geq 2$) channels on the time axis;
  (b) removing from the period $\tau_V$ of each vertical blanking signal of each of the divided video signals a signal of a period $\tau_1$ ($\tau_1 < \tau_V$) and removing from the period $\tau_H$ of each horizontal blanking signal s signal of a period $\tau_2$ ($\tau_2 < \tau_H$), and expanding the time axis of the video signal lacking the signals of the periods $\tau_1$ and $\tau_2$ thereby to form narrow-band video signals of N channels of a time axis expansion ratio M where $M \approx N/(1-\tau_1/T_V)(1-\tau_2/T_H)$; and (c) recording said narrow-band video signal of N channels on a plurality of magnetic tracks formed on said recording medium by a plurality of magnetic heads;

(d) reproducing said narrow-band video signals of N channels recorded on said recording medium by a plurality of playback heads;

(e) compressing the time axis of the reproduced video signals of N channels, and adding the signal of the period $\tau_1$ to the vertical blanking signal and adding the signal of the period 2 to the horizontal blanking signal; and (f) connecting the compressed video signals of N channels serially to form said broad-band video signal of a vertical scanning period $T_V$ and a horizontal scanning period $T_H$.

17. A magnetic recording and playback apparatus for recording and reproducing a video signal on and from a magnetic recording medium in a magnetic recording and playback apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signal in a plurality of channels, said apparatus comprising the steps of:

(a) means for dividing said broad-band video signal into signals of N (N≧2) channels on the time axis;

(b) means for removing from the period $\tau_V$ of each vertical blanking signal of each of the divided video signals a signal of a period $\tau_1$ ($\tau_1 < \tau_V$);

(c) means for expanding the time axis of the video signal from which the signal of the period $\tau_1$ has been removed thereby to form narrow-band video signals of N channels of a horizontal scanning period TH where, $TH' \approx N \times T_H/(1-\tau_1/T_V)$;

(d) means for recording said narrow-band video signals of N channels on a plurality of magnetic tracks formed on said recording medium by a plurality of magnetic recording heads;

(e) reproducing means for reproducing said narrow-band video signals of N channels recorded on said recording medium by a plurality of playback heads;

(f) time axis compressing means for compressing the time axis of the reproduced video signals of N channels, and for adding the signal of the period $\tau_1$ to the vertical blanking signal; and (g) means for connecting serially the compressed video signals of N channels compressed by said time axis compressing means to form said broad-band video signal of a vertical scanning period $T_V$ and a horizontal scanning period TH.

18. A magnetic recording and playback apparatus for recording and reproducing a video signal on and from a magnetic recording medium in a magnetic recording apparatus by transforming a broad-band video signal of a vertical scanning period $T_V$ including a vertical blanking signal with a period $\tau_V$ and a horizontal scanning period $T_H$ including a horizontal blanking signal with a period $\tau_H$ into narrow-band video signals in a plurality of channels, said apparatus comprising:

(a) means for dividing said broad-band video signal into signals of N (N≧2) channels on the time axis;

(b) means for removing from the period $\tau_V$ of each vertical blanking signal of each of the divided video signals a signal of a period $\tau_1$ ($\tau_1 < \tau_V$);

(c) means for removing from the period $\tau_H$ of the horizontal blanking signal a signal of a period $\tau_2$ ($\tau_2 < \tau_H$), (d) means for expanding the time axis of the video signal from which the signals of the period $\tau_1$ and $\tau_2$ have been removed thereby to form a narrow-band video signals of N channels of a time axis expansion ratio M wherein $M \approx N/(1-\tau_1/T_V)(1-\tau_2/T_H)$; and (e) means for recording said narrow-band video signals of N channels on a plurality of magnetic tracks found on said recording medium by using a plurality of magnetic heads;

(f) reproducing means for reproducing said narrow-band video signals of N channels recorded on said recording medium by a plurality of playback heads;

(g) time axis compressing means for compressing the time axis of reproduced video signals of N channels, and for adding the signal of the period $\tau_1$ to the vertical blanking signal and adding the signal of the period $\tau_2$ to the horizontal blanking signal; and (h) means for connecting the expanded video signals of N channels serially to form said broad-band video signal of a vertical scanning period $T_V$ and a horizontal scanning period $T_H$.

* * * * *